US006508561B1

(12) United States Patent
Alie et al.

(10) Patent No.: US 6,508,561 B1
(45) Date of Patent: Jan. 21, 2003

(54) OPTICAL MIRROR COATINGS FOR HIGH-TEMPERATURE DIFFUSION BARRIERS AND MIRROR SHAPING

(75) Inventors: Susan A. Alie, Stoneham, MA (US); Allyson Hartzell, Cambridge, MA (US); Maurice Karpman, Brookline, MA (US); John R. Martin, Foxborough, MA (US); Kieran Nunan, Carlisle, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/981,369

(22) Filed: Oct. 17, 2001

(51) Int. Cl.$^7$ ................................................ G02B 7/182
(52) U.S. Cl. ........................ 359/883; 359/838; 359/599
(58) Field of Search .................... 359/883, 884, 359/838, 846, 599, 514; 136/251, 256, 259; 427/337, 402, 404; 428/457, 195, 207, 913; 503/227

(56) References Cited

U.S. PATENT DOCUMENTS

| 5,227,499 | A | * | 7/1993 | McGowan et al. | ............. 540/1 |
| 5,487,792 | A | * | 1/1996 | King et al. | ............. 106/14.43 |
| 6,281,166 | B1 | * | 8/2001 | Kronzer | ............. 428/323 |

OTHER PUBLICATIONS

K. Nunan et. al., LPCVD and PECVD Operations Designed for iMEMS Sensor Devices, Vacuum Technology and Coating, Jan. 2001, pp. 27–37.
R.F. Bunshah et. al., Deposition Technologies for Films and Coatings; Developments and Applications, Noyes Publications, 1982, pp. 376–378 and 526.
J.M. Poate, Diffusion and reactions in gold films, Solid State Tech., Apr. 1982, pp. 227–234.
Z. Marinkovic and V. Simic, Journal of the Less Common Metals, 115, 1986, pp. 225–234.
Z. Marinkovic and V. Simic, Thin Solid Films, 156, 1988, pp. 105–115.
K. Masahiro and S. Noboru, Journal Materials Science, 28, 1993, pp. 5088–5091.
B. Doyle, et. al., Thin Solid Films, 104, 1983, pp. 69–79.
Yong Tae Kim, et. al., Japan Journal of Applied Physics, 32, 1993, pp. 6126–6131.
H. Kattelus, et. al., Journal of Vacuum Science Technology, A, 3, 1985, pp. 2246–2254.
P.J. Pokela, et. al., Journal of the Electrochemical Society, 138(7), 1991, pp. 2125–2129.
H. Hieber and K. Pape, Gold Bulletin, 15(3), 1982, pp. 90–100.
M. Kitada, et. al., Journal of Magnetism and Magnetic Materials, 123, 1993, pp. 193–198.
M. Kitada, Thin Solid Films, 250, 1994, pp. 111–114.

(List continued on next page.)

Primary Examiner—Mohammad Sikder
(74) Attorney, Agent, or Firm—Bromberg & Sunstein LLP

(57) ABSTRACT

Optical mirror coatings are used for high-temperature diffusion barriers and mirror shaping. Certain materials for use as high-temperature diffusion barriers under optical mirror coatings include metals that have high melting and/or boiling points and amorphous and partially recrystallized inorganic amorphous materials that have high glass transition temperatures (Tg). Candidate metals are selected based upon the boiling point or a combination of melting point and boiling point. Candidate amorphous and partially recrystallized inorganic amorphous materials are selected based upon the glass transition temperature. Optical mirrors having such high-temperature diffusion barriers maintain reflectivity when exposed to elevated temperatures, and are particularly useful in optical Micro Electro-Mechanical Systems (MEMS) that are exposed to high-temperature manufacturing processes. Optical mirrors are shaped using tensile and/or compressive films.

19 Claims, 9 Drawing Sheets

OTHER PUBLICATIONS

S. Wolf and R. Tauber, Silicon Processing for the VLSI Era, vol. 1: Process Technology, 2nd Edition, Lattice Press, 2000, pp. 202–207.
V. Malina, et. al., Semiconductor Science and Technology, 11, 1996, pp. 1121–1126.
D. L. Smith, Thin–Film Deposition, McGraw–Hill, 1995, pp. 188–200.
S. Wolf and R. Tauber, Silicon Processing for the VLSI Era, vol. 1: Process Technology, 2nd Edition, Lattice Press, 2000, pp. 106–112.
R. F. Bunshah et. al., Deposition Technologies for Films and Coatings; Developments and Applications, Noyes Publications, 1982, pp. 63–72.
K. Masahiro et al., The effect of annealing on the magnetic properties of permalloy films in permalloy –Ta bilayers, Journal of magnetism and Magnetic Materials, 147, 1995, pp. 213–220.
J. M. Poate, "Diffusion and Reactions in Gold Films, A Review of Fundamental Aspects," Gold Bulletin, 1981, 14(1), pp. 2–11.
D. Gupta, "Special Aspects of Diffusion In Metallic Thin Films," IBM Thomas J. Watson Research Center, Mst. Res. Soc. Symp., vol. 47, 1995, pp. 11–26.
M. Aguilar, "Effect of Residual Stress on the Stability of Gold Thin Film Surfaces," Materials and Manufacturing Process, vol. 13, No. 3, 1998, pp. 445–453.
E. Kaminska et. al., "Deposition and Properties of Refractory Metallic Films For Diffusion Barrier Application in Au–Based Metallizations to III–V Semiconductors," Institute of Electron Technology, 32, 4, 1999, pp. 304–326.
M. Vestel et. al., TEM, XPS, and EDX Characterization of the Si Wafer Backside Sputtered Cr/Au Metallization Films, $42^{nd}$ International SAMPE Symposium, May 4–8 1997.
M. A. George et. al., "Electrical, Spectroscopic, and Morphological Investigation of Chromium Diffusion through Gold Films," Thin Solid Films, 189, 1990, pp. 59–72.
A. Munitz et. al., "The Increase in the Electrical Resistance of Heat–Treated Au/Cr Films," Thin Solid Films, 71, 1980, pp. 177–188.
J. E. Baker et. al., "Thermal Annealing Study of Au/Ti–W Metallization on Silicon," Thin Solid Films, 69, 1980, pp. 53–62.
R. S. Nowicki, "Comparison of RF Sputtered Titanium –Tungsten/Gold with DC Magnetron Sputtered Tungsten/ Gold on Silicon," Solid State Technology, Jun. 1982 pp. 127–130.
J. N. Musher et. al., "Low–Temperature CVD TiN as a Diffusion Barrier Between Bold and Silicon," Journal of Electronic Materials, vol. 20. No. 12, 1991; pp. 1105–1107.
M. White, "Thin Polymer Films," Thin Solid Films, 18, 1973, pp. 157–172.
N.J. Archer, "Chemical Vapour Deposition," Phys. Technol, vol. 10, 1979, pp. 152–161.
E. W. Williams, "Gold Ion Plating–A Recently Developed Coating Process," pp. 30–34.
"Ion Plating," Engineering, pp. 52–55 Jan. 1978, pp. 52–55.
T. Spalvins, "New Application of Sputtering and Ion Plating," American Society of Mechanical Engineers, 1977, pp. 1–9.
T. Wydeven et. al., "Antireflection coating prepared by plasma polymerization of perfluorobutene–2," Applied Optics, vol. 15, No. 1, Jan. 1976, pp 132–136.
H. Weinbeg, "Silicon in Motion," PT Design, www.pt-design.com, Apr. 1999.
J. Doscher, "Using Micro–Machined Motion Sensors to Improve the Human/Machine Interface," Multimedia Systems Design, Jan. 1999.
"Deposition Processes Part II.," MRS Bulletin, vol. XIII No. 12, Dec. 1988, pp. 33–67.
S. F. Brown, "Big Jobs Are Going To Micro–Machines," Fortune, May 10, 1999, pp. 27–30.
F. Goodenough, "Combining Micro–Machining with Analog IC Technology," Electronic Design, Aug. 8, 1991.
"Sputtering Review," Semiconductor International, p. 46.
Drawing labeled "Ion Plating," Mat'ls Res Coordin. Presentations, Dec. 17, 1979, Sep. 11, 1980.
C. Achete, "Interdiffusion and Compound Formation in the Au–Pd–Si Thin Film System," Vacuum, vol. 41, 1990, pp. 824–826.
A. Munitz et al., "Electrical Resistance and Auger electron Spectroscopy Characteristics of Interdiffusion in Au Metal Bilayer Films," Thin Solid Films, 112, 1984, pp. 139–147.
A. Bukaluk, "Comparative AES Studies of Grain Boundary Diffusion in Thin Polycrystalline Ag/Pd, Au/Pd and Cu/Pd Films," Applied Surface Science, 144–145, 1999, pp. 395–398.
B. L. Doyle et al., "Au Diffusion in Amorphous and Polycrystalline $Ni_{0.55}$ $Nb_{0.45}$ , " J. Appl. Phys., vol. 53, No. 9, Sep. 1982, pp. 6186–6190.
P. J. Pokela et al., "Thermal Stability and the Failure Mechanism of the $Al/W_{76}$ $N_{24}$/Au Metallization," Thin Solid Films, 208, 1992, pp. 33–37.

* cited by examiner

| Metal | Symbol | At Number | MP* °C | BP-760mm °C | MP*BP $(10^{+6})\,°K^2$ |
|---|---|---|---|---|---|
| Tungsten | W | 74 | 3410 | 5660 | 21.9 |
| Rhenium | Re | 75 | 3180 | 5596 | 20.3 |
| Tantalum | Ta | 73 | 2996 | 5429 | 18.6 |
| Osmium | Os | 76 | 3045 | 5027 | 17.6 |
| Molybdenum | Mo | 42 | 2627 | 4639 | 14.2 |
| Niobium | Nb | 41 | 2477 | 4944 | 14.3 |
| Ruthenium | Ru | 44 | 2546 | 4400 | 13.2 |
| Hafnium | Hf | 72 | 2233 | 4603 | 12.2 |
| Iridium | Ir | 77 | 2410 | 4130 | 11.8 |
| Zirconium | Zr | 40 | 1852 | 4409 | 9.9 |
| Rhodium | Rh | 45 | 1966 | 3695 | 8.9 |
| Platinum | Pt | 78 | 1768 | 3825 | 8.4 |
| Vanadium | V | 23 | 1890 | 3380 | 7.9 |
| Titanium | Ti | 22 | 1660 | 3277 | 6.9 |
| Chromium | Cr | 24 | 1907 | 2680 | 6.4 |
| Palladium | Pd | 46 | 1555 | 3167 | 6.3 |
| Cobalt | Co | 27 | 1495 | 2927 | 5.7 |
| Iron | Fe | 26 | 1535 | 2861 | 5.7 |
| Nickel | Ni | 28 | 1453 | 2732 | 5.2 |
| Silicon | Si | 14 | 1410 | 2355 | 4.4 |
| Gold | Au | 79 | 1064 | 2808 | 4.1 |
| Copper | Cu | 29 | 1085 | 2562 | 3.8 |
| Silver | Ag | 47 | 962 | 2212 | 3.1 |
| Aluminum | Al | 13 | 660 | 2517 | 2.6 |
| Tin | Sn | 50 | 232 | 2270 | 1.3 |
| Mercury | Hg | 80 | -39 | 357 | 0.15 |

FIG. 1

OPTICAL MIRROR COATINGS FOR HIGH-TEMPERATURE DIFFUSION BARRIERS AND MIRROR SHAPING

FIELD OF THE INVENTION

The present invention relates generally to optical network, and more particularly to optical mirror coatings for high-temperature diffusion barriers and mirror shaping.

REFERENCES

The following references are used through this patent application, and are hereby incorporated herein by reference in their entireties:
[1] K. Nunan et. al., LPCVD and PECVD Operations Designed for iMEMS Sensor Devices, Vacuum Technology and Coating, January 2001, pp. 27–37;
[2] R. F. Bunshah et. al., Deposition Technologies for Films and Coatings;
Developments and Applications, Noyes Publications, 1982, pp. 376–378 and 526;
[3] J. M. Poate, Diffusion and reactions in gold films, Solid State Tech., April 1982, 227–234 and Gold Bull., 14(1), 1981, pp. 2–11;
[4] Z. Marinkovic and V. Simic, Journal of the Less Common Metals, 115, 1986, pp. 225–234;
[5] Z. Marinkovic and V. Simic, Thin Solid Films, 156, 1988, pp. 105–115;
[6] K. Masahiro and S. Noboru, Journal of Materials Science, 28, 1993, pp. 5088–5091;
[7] B. Doyle, et. al., Thin Solid Films, 104, 1983, pp. 69–79;
[8] Yong Tae Kim, et. al., Japan Journal of Applied Physics, 32, 1993, pp. 6126–6131 and H. Kattelus, et. al., Journal of Vacuum Science Technology, A, 3, 1985, 2246;
[9] P. J. Pokela, et. al., Journal of the Electrochemical Society, 138(7), 1991, pp. 2125–2129;
[10] H. Hieber and K. Pape, Gold Bull., 15(3), 1982, pp. 90–100;
[11] M. Kitada, et. al., Journal of Magnetism and Magnetic Materials, 123, 1993, pp. 193–198;
[12] M. Kitada, Thin Solid Films, 250, 1994, pp. 111–114;
[13] Stanley Wolf and Richard Tauber, Silicon Processing for the VLSI Era, Volume 1: Process Technology, 2nd Edition, Lattice Press, 2000, pp. 202–207;
[14] V. Malina, et. al., Semiconductor Science and Technology, 11, 1996, pp. 1121–1126.
[15] Donald L. Smiith, Thin-Film Deposition, McGraw-Hill, 1995, pp. 188–200.
[16] Stanley Wolf and Richard Tauber, Silicon Processing for the VLSI Era, Volume 1: Process Technology, 2nd Edition, Lattice Press, 2000, pp. 106–112; and
[17] R. F. Bunshah et. al., Deposition Technologies for Films and Coatings; Developments and Applications, Noyes Publications, 1982, pp. 63–72.

BACKGROUND OF THE INVENTION

Mirrors used in optical applications, such as optical networking applications, must be highly reflective in order to minimize dispersion and reduce optical signal loss. These optical mirrors often consist of a thin film of highly-reflective material, such as gold, platinum, or aluminum, layered directly or indirectly over a substrate, such as single crystal silicon or polysilicon. The mirror layer is typically very thin in order to reduce problems from film stress and thermal expansion. The mirror layer may be placed directly on the substrate, although the mirror layer is quite often separated from the substrate by one or more additional material layers. For convenience, the material onto which the mirror layer is placed (whether the substrate or an additional material layer) is referred to hereinafter as the "backing layer" for the mirror layer.

One reason for using a backing layer is to improve adhesion of the mirror layer onto a lower material layer (whether the substrate or an additional material layer). Depending on the types of materials used in the optical mirror, the mirror layer may not adhere well to the lower material layer if placed directly on top of the lower material layer. Therefore, a backing layer may be used to bond the mirror layer to the lower material layer. In order to effectively bond the mirror layer to the lower material layer, the backing layer material must adhere well to both the lower material layer and the mirror layer.

Another reason for using a backing layer is as a diffusion barrier to prevent interdiffusion and/or the formation of intermetallics between the mirror layer and a lower material layer (whether the substrate or another material layer).

An intermetallic is a type of alloy containing two or more metal atoms. In studies of gold films, it has been found that gold and silicon react at temperatures considerably below the eutectic (363C) [3], that gold thin films react with metals at room temperature if both the metal and the resulting compound(s) have melting points below approximately 700C [4], and that the reaction rate of intermetallic formation is controlled by diffusion and the interdiffusion coefficient is linearly dependent on melting point [5]. This linkage between intermetallic formation and diffusion was also noted in a study of gold-titanium, where diffusion was measurable at temperatures above 175C, allowing formation of intermetallics at temperatures above 250C [6].

Interdiffusion is essentially the mixing of two materials due to random thermal motion. Interdiffusion can occur, for example, when atoms from the lower material layer diffuse into the mirror layer or when atoms from the mirror layer diffuse into the lower material layer. In order for interdiffusion to occur, an atom must acquire a sufficient amount of energy to leave its present material so as to become available for diffusion into the other material, and there must be a "free volume" in the other material into which the atom can diffuse. Heat can provide the energy required by the atom to leave its present material and/or the energy required (if any) to create "free volume". As-deposited metal films have more lattice defects (vacancies, grain boundaries, and dislocations) than do annealed films that are in thermal equilibrium. It has been found that grain boundary diffusion in gold is at least an order of magnitude higher than bulk diffusion [3]. Thus, small grain size films may be more susceptible to diffusion than coarser films. One way to avoid grain boundary diffusion is to use an amorphous thin film as a diffusion barrier, since amorphous films have no grain boundaries. For example, it has been found that amorphous nickel-niobium [7], amorphous tungsten-nitride [8], and amorphous tantalum-silicon-nitride [9] do not readily interdiffuse with silicon or gold.

Depending on the types of materials used in the optical mirror, interdiffusion and/or the formation of intermetallics may occur between the mirror layer and the lower material layer if the mirror layer is placed directly in contact with the lower material layer. Interdiffusion and/or the formation of intermetallics may contaminate the mirror and reduce the mirror's reflectivity. Therefore, a backing layer may be used to prevent interdiffusion and/or the formation of intermetallics between the mirror layer and the lower material layer. In order to effectively prevent interdiffusion and/or the formation of intermetallics between the mirror layer and the lower material layer, the backing layer material must not interdiffuse or form intermetallics with the mirror layer and must prevent the lower material layer from interdiffusing and forming intermetallics with the mirror layer.

Another reason for using a backing layer is to physically strengthen the mirror layer to prevent undue stresses in the mirror layer. Stresses in the mirror layer can cause gradual changes in the microstructure of the mirror layer material [10]. In a study focusing on a nickel-iron alloy for magnetoresistive elements [11], an approximate relationship was found between the melting temperature of a metal and the onset of intermetallic formation, and a link was also found between the onset temperature and diffusion. In a study focusing on diffusion and intermetallic formation in gold-niobium electrical contacts [12], interdiffusion, intermetallics, and gold hillocks (which were objectionable because they interfered with electrical contacts) were observed at temperatures above 350C.

A common optical mirror configuration uses a thin gold film as the mirror layer and uses silicon as the substrate. The gold mirror layer can be placed directly on the silicon substrate. However, the gold mirror layer does not adhere well to the silicon substrate, and therefore the gold mirror layer can be easily damaged. Also, the silicon and the gold tend to interdiffuse and form intermetallic compounds, even at relatively low temperatures. This contaminates the gold mirror layer, which can reduce the mirror's reflectivity.

Therefore, a backing layer of chromium or titanium is often used between the gold mirror layer and the silicon substrate in order to improve adhesion and prevent contamination. The chromium or titanium backing layer adheres well to the silicon substrate, and the gold mirror layer adheres well to the chromium or titanium backing layer. The chromium or titanium backing layer does not interdiffuse or form intermetallics with the gold mirror layer at relatively low temperatures, particularly at temperatures at which the optical mirror is typically used. The chromium or titanium backing layer also acts as a diffusion barrier to prevent the silicon substrate from interdiffusing with the gold mirror layer.

Even though the optical mirror is typically used at relatively low temperatures, the optical mirror may be subjected at times to high temperatures. For example, the optical mirror may be exposed to several high temperature processes when the optical mirror is assembled into a hermetically-sealed package. At these high temperatures, the chromium or titanium backing layer can interdiffuse with the gold mirror layer and contaminate the gold mirror layer. Extensive interdiffusion of gold and chromium has been observed with exposure to a temperature of 300C for ten minutes, and many typical assembly processes use temperatures near and above 300C. Thus, even though a high-quality gold-over-silicon optical mirror can be constructed by using a chromium or titanium backing layer, the gold-over-silicon optical mirror can be destroyed through various high-temperature ancillary processes. Similar problems can occur in other optical mirror configurations from exposure to high temperatures.

SUMMARY OF THE INVENTION

Certain materials for use as high-temperature diffusion barriers under optical mirror coatings include metals that have high melting and/or boiling points and amorphous and partially recrystallized inorganic amorphous materials that have high glass transition temperatures (Tg). Candidate metals are selected based upon the boiling point or a combination of melting point and boiling point. Candidate amorphous and partially recrystallized inorganic amorphous materials are selected based upon the glass transition temperature. Optical mirrors having such high-temperature diffusion barriers maintain reflectivity when exposed to elevated temperatures, and are particularly useful in optical Micro Electro-Mechanical Systems (MEMS) that are exposed to high-temperature manufacturing processes.

In accordance with one aspect of the invention, an optical mirror includes an optical mirror coating and a high-temperature diffusion barrier that does not readily interdiffuse with the optical mirror coating at selected elevated temperatures.

The high-temperature diffusion barrier may consist of any of a variety of high-temperature metals. The high-temperature diffusion barrier may be a high-temperature metal having an atmospheric boiling point (BP) above approximately 3550 degrees Kelvin. The high-temperature diffusion barrier may be a high-temperature metal having a melting point and an atmospheric boiling point such that the product of the melting point and the atmospheric boiling point (MP*BP) is above approximately $7.5 \times 10^6 K^2$. Exemplary high-temperature metallic diffusion barrier materials include vanadium, platinum, rhodium, zirconium, hafnium, iridium, ruthenium, niobium, molybdenum, osmium, tantalum, rhenium, and tungsten.

The high-temperature diffusion barrier may consist of any of a variety of high-temperature amorphous materials, and, in particular, any of a variety of high-temperature amorphous solids having a glass transition temperature above approximately 500 degrees Celsius. Exemplary high-temperature amorphous diffusion barrier materials include amorphous titanium nitride, amorphous nickel-niobium, amorphous tantalum-silicon-nitride, amorphous tungsten nitride, amorphous silicon nitride, and amorphous low-stress silicon nitride.

The high-temperature diffusion barrier may consist of any of a variety of partially recrystallized inorganic amorphous materials having a glass transition temperature above approximately 500 degrees Celsius. Exemplary high-temperature partially recrystallized inorganic amorphous materials include an amorphous tungsten nitride material having tungsten nitride crystals dispersed with tungsten crystals.

In accordance with another aspect of the invention, an apparatus, such as an optical Micro Electro-Mechanical System (MEMS), includes a optical mirror having an optical mirror coating and a high-temperature diffusion barrier that does not readily interdiffuse with the optical mirror coating at selected elevated temperatures.

In accordance with yet another aspect of the invention, a method for producing an optical mirror involves selecting a high-temperature diffusion barrier material and depositing the high-temperature diffusion barrier material underneath an optical mirror coating. Selecting the high-temperature diffusion barrier material may involve selecting a high-temperature metallic material based upon an atmospheric boiling point of the material or a combination of the melting point and the atmospheric boiling point of the material. Selecting the high temperature diffusion barrier material may involve selecting a high-temperature amorphous or partially recrystallized inorganic amorphous material based upon a glass transition temperature of the material.

In accordance with yet another aspect of the invention, a method for forming a substantially non-flat optical mirror involves forming at least one film layer on at least one of a front side and a back side of a mirror stack layer such that the film stresses of the at least one film layer shape the optical mirror into a predetermined substantially non-flat shape. The at least one film layer may include a tensile film and/or a compressive film. In one embodiment, the predetermined substantially non-flat shape is a substantially concave shape, which can be formed by forming a tensile film on the front side and/or forming a compressive film on the back side. In another embodiment, the predetermined substantially non-flat shape is a substantially convex shape, which can be formed by forming a tensile film on the back side and/or forming a compressive film on the front side.

In accordance with yet another aspect of the invention, a substantially non-flat optical mirror includes at least one mirror stack layer having a front side and a back side and at least one film layer formed on at least one of the front side and the back side such that the film stresses of the at least one film layer shape the optical mirror into a predetermined substantially non-flat shape. The at least one film layer may include a tensile film and/or a compressive film. The substantially non-flat optical mirror may have a substantially concave shape, and may have a tensile film formed on the front side and/or a compressive film formed on the back side. The substantially non-flat optical mirror may have a substantially convex shape, and may have a tensile film formed on the back side and/or a compressive film formed on the front side. The optical mirror may be a micro machined optical mirror, and the mirror stack layer may be a single crystal silicon or polysilicon layer.

In accordance with yet another aspect of the invention, a method for forming a substantially flat optical mirror involves forming at least one film layer on one of the front side and the back side of a mirror stack layer such that the film stresses of the at least one film layer shape the optical mirror into a predetermined substantially flat shape. The substantially flat optical mirror can be formed using tensile and/or compressive films.

In accordance with yet another aspect of the invention, a substantially flat optical mirror includes at least one mirror stack layer having a front side and a back side and at least one film layer formed on one of the front side and the back side such that the film stresses of the at least one film layer shape the optical mirror into a predetermined substantially flat shape. The substantially flat optical mirror can be formed using tensile and/or compressive films. The optical mirror may be a micro machined optical mirror, and the mirror stack layer may be a single crystal silicon or polysilicon layer.

In accordance with yet another aspect of the invention, a method for producing an optical mirror having a predetermined target shape involves forming an optical mirror stack having a plurality of mirror stack layers, where each mirror stack layer has an initial film stress, and the combined initial film stresses of the plurality of mirror stack layers shapes the optical mirror stack into an initial shape different from the predetermined target shape. The film stress of at least one mirror stack layer is subsequently altered so as to change the shape of the optical mirror stack from the initial shape to the predetermined target shape.

BRIEF DESCRIPTION OF THE DRAWINGS

In the accompanying drawings:

FIG. 1 is a table summarizing the melting and boiling points for various metals;

DETAILED DESCRIPTION OF A PREFERRED EMBODIMENT

Figure 2:
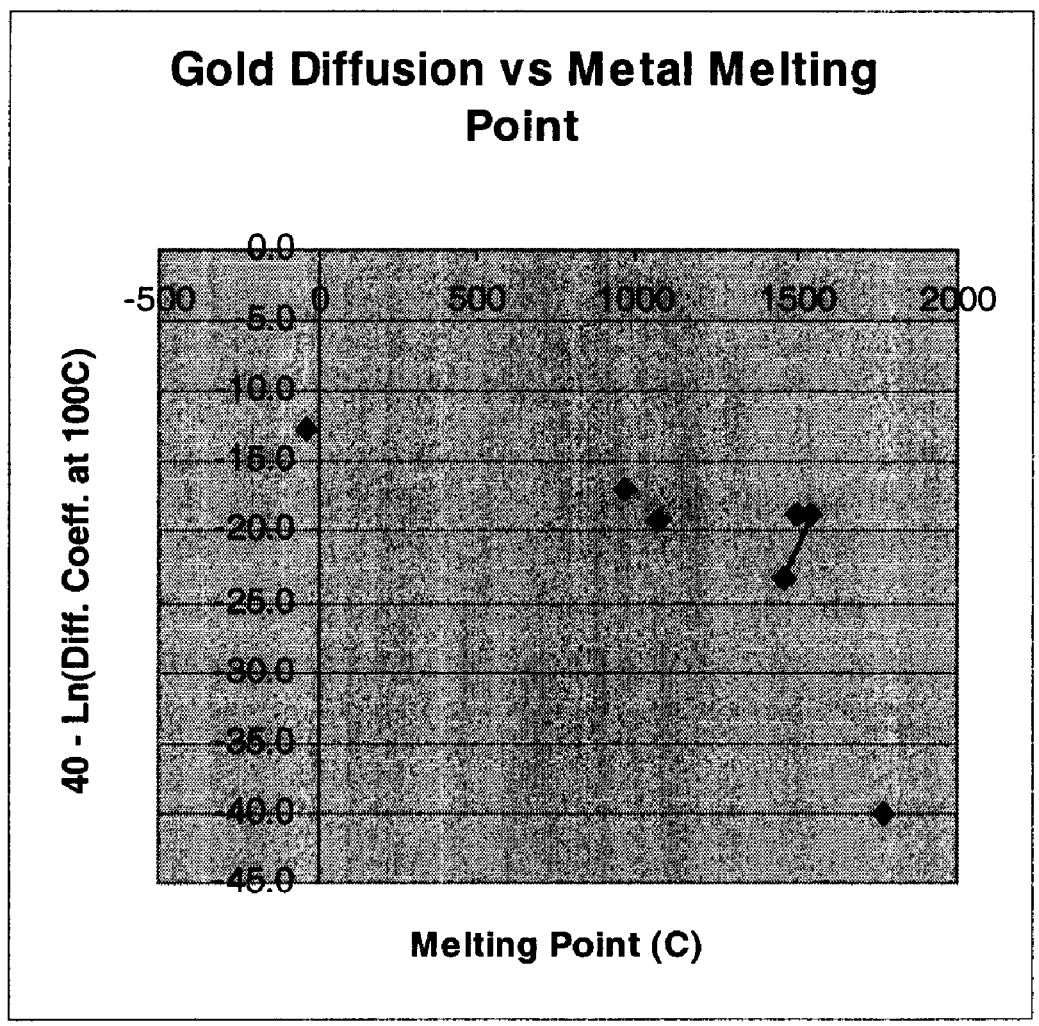
FIG. 2 is a plot showing the relationship between gold diffusion and melting point for various metals.

In an embodiment of the present invention, high-temperature diffusion barriers reduce interdiffusion and/or the formation of intermetallics (referred to hereinafter collectively as interdiffusion) caused by exposure of the optical mirror to high temperature processes. Three classes of high-temperature materials are described for use as high-temperature diffusion barriers, specifically substantially crystalline metals that have high melting and/or boiling points (MP/BP); substantially amorphous materials with high glass transition temperatures (Tg); and partially recrystallized inorganic amorphous materials with high glass transition temperatures (Tg).

High-Temperature Metallic Diffusion Barriers

High MP metals with substantially crystalline structures are thermodynamically very stable (low energy). Atoms in such high MP metals do not readily break away from the crystalline structure or move about sufficiently to create "free space" for interdiffusion. Therefore, even during high temperature processes, the probability of interdiffusion involving such high MP metals is low. It should be noted that "free volume" is higher in the grain boundary regions, particularly in unannealed films. However, even in these disordered (amorphous) regions, interdiffusion would be reduced in high BP metals, as discussed below.

When an atom in a metal acquires sufficient energy to leave the crystalline structure, the atom might be viewed as "melting" in that the atom enters an amorphous, disordered environment. If interatomic binding forces are low in such an amorphous "liquid," the atoms are highly mobile (perhaps even gaseous), and readily diffuse. If, however, the interatomic binding forces are high, atoms do not readily leave and diffuse into adjacent materials. High BP metals generally have high interatomic binding forces. Therefore, high BP metals do not readily diffuse into adjacent materials at typical process and use temperatures. The free volume of solids and liquids increases with temperature up to the boiling point. Thus, when compared to low BP metals, the free volume of high BP metals is low at the temperatures typically encountered during processing and use. Therefore, high BP metals are generally less susceptible to in-diffusion of foreign materials than low BP metals at these temperatures.

Thus, metals having a high MP and/or a high BP generally do not interdiffuse with other materials at typical process and use temperatures. This is due in part to the stability of the crystalline structure and the high interatomic binding forces in such metals. A high-temperature metallic diffusion barrier for an optical mirror coating can be selected based upon melting temperature and/or atmospheric boiling temperature of the metal.

FIG. 1 is a table summarizing the approximate melting temperatures and boiling temperatures for various metals. In order to identify candidates for a high-temperature diffusion barrier under a gold mirror coating, plots were made reflecting gold diffusion at 100C in relation to MP, BP, and the product of MT and BP (i.e., MP*BP).

FIG. 2 is a plot showing the relationship between MP and gold diffusion (in centimeters squared per second) for some of the metals listed in FIG. 1.

Figure 3:
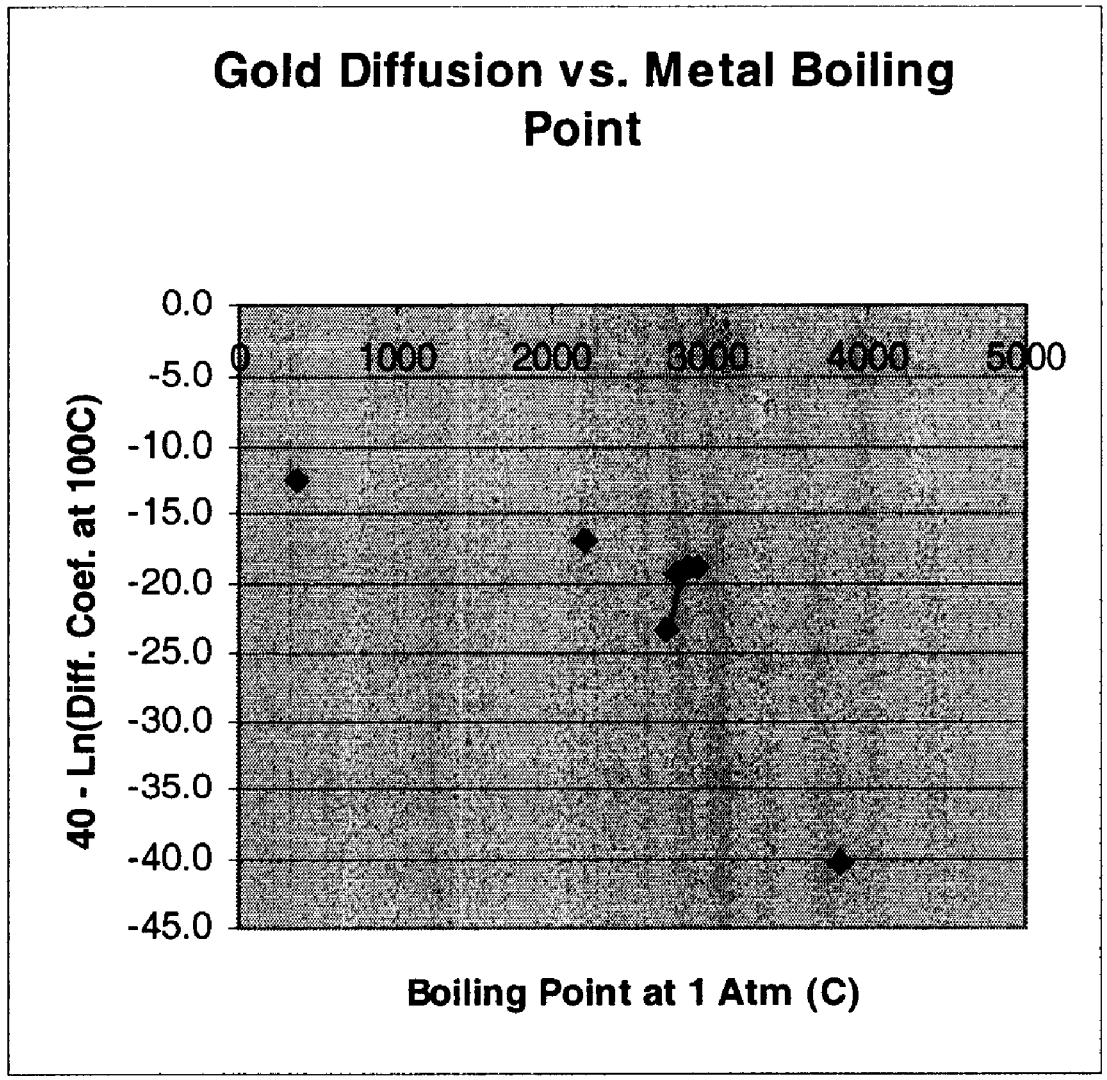
FIG. 3 is a plot showing the relationship between gold diffusion and atmospheric boiling point for various metals.

FIG. 3 is a plot showing the relationship between atmospheric BP and gold diffusion (in centimeters squared per second) for some of the metals listed in FIG. 1.

Figure 4:
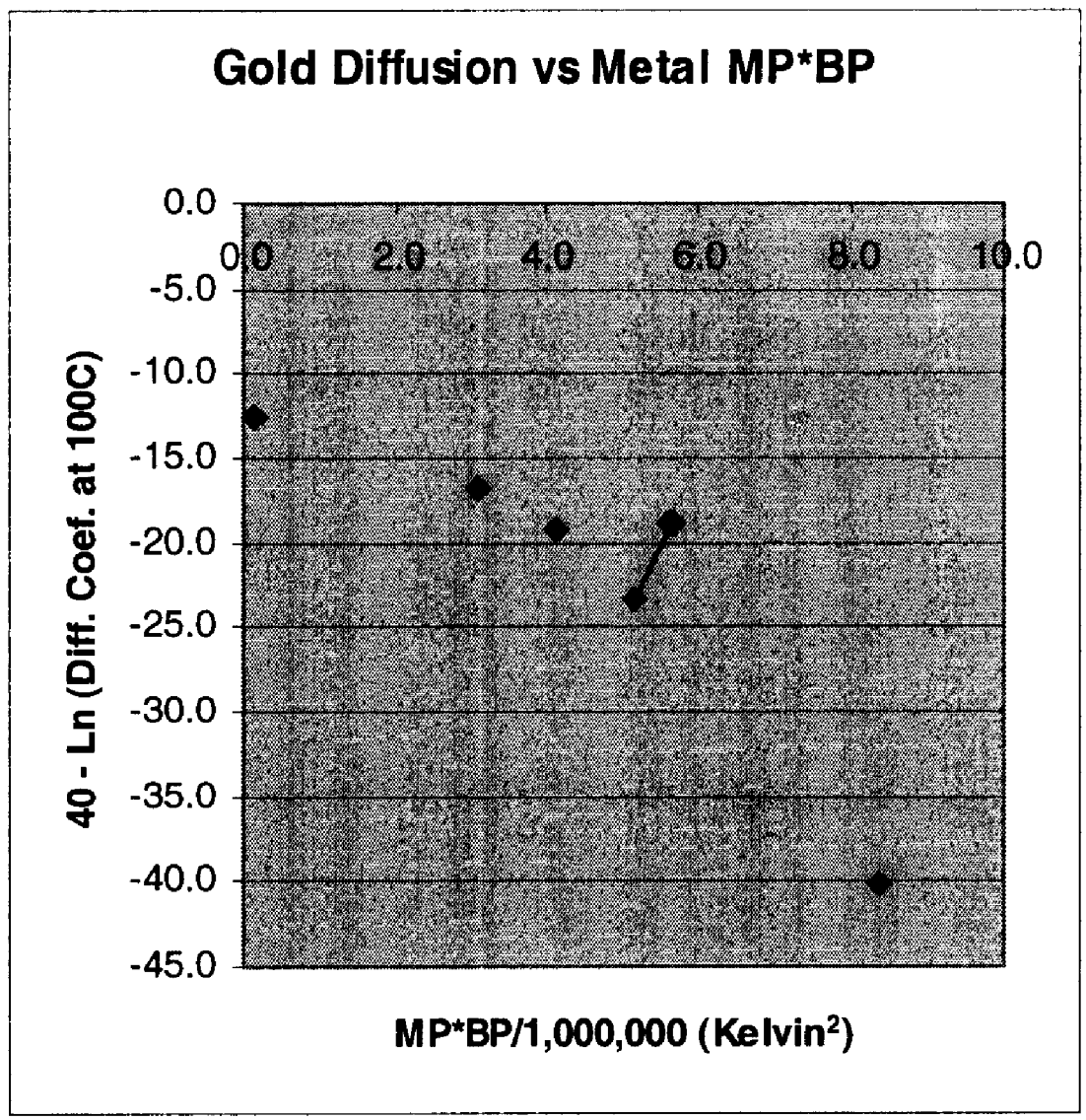
FIG. 4 is a plot showing the relationship between the product of melting point and atmospheric boiling point and gold diffusion for various metals.

FIG. 4 is a plot showing the relationship between the product of MP and BP (i.e., MP*BP) and gold diffusion (in centimeters squared per second) for some of the metals listed in FIG. 1.

In general, metals having a MP above approximately 2000K (approximately 1727C) and/or an atmospheric BP above approximately 3550K (approximately 3277C) do not readily interdiffuse with gold at 100C. Thus, with reference to FIG. 1, metals such as vanadium, platinum, rhodium, zirconium, iridium, ruthenium, niobium, hafnium, molybdenum, osmium, tantalum, rhenium, and tungsten are good candidates for a high-temperature diffusion barrier under a gold mirror coating.

One notable exception is chromium. Although chromium has a MP above 2000K, it has a BP well below 3550K, and has been found to diffuse with gold at typical process and use temperatures.

Thus, MP alone may be an insufficient indicator for identifying candidate materials for a high-temperature diffusion barrier under gold, particularly for metals having a MP near 2000K. However, MP in combination with BP may be a better indicator for identifying candidate materials for a high-temperature diffusion barrier under gold. In particular, metals having an atmospheric BP above approximately 3550K and metals for which the product of the MP and BP (i.e., MP*BP) is above approximately $7.5 \times 10^6 K^2$ are good candidate materials for a high-temperature diffusion barrier under gold. Thus, using the product of MP and BP, chromium would not be considered a good candidate for a high-temperature diffusion barrier under gold, although metals such as vanadium, platinum, and zirconium (which have a lower MP but a substantially higher BP than chromium) would be considered good candidates for a high-temperature diffusion barrier under gold. Platinum has been found to be a good high-temperature diffusion barrier under gold, as it does not readily diffuse with gold at typical process and use temperatures.

It should be noted that the applicability of a particular metal for a high-temperature diffusion barrier under a gold mirror coating depends not only on its diffusion properties, but also on a number of factors including adhesion properties, mechanical stress properties, chemical reactivity, and thermal expansion properties, and therefore some metals might perform better than others as a high-temperature diffusion barrier under a gold mirror coating.

Figure 5A:
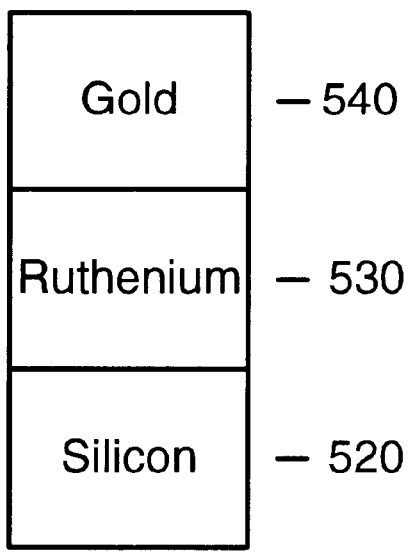
FIG. 5A shows an exemplary optical mirror using ruthenium as a high-temperature diffusion barrier without a chromium adhesion layer in accordance with an embodiment of the present invention.
Figure 5B:
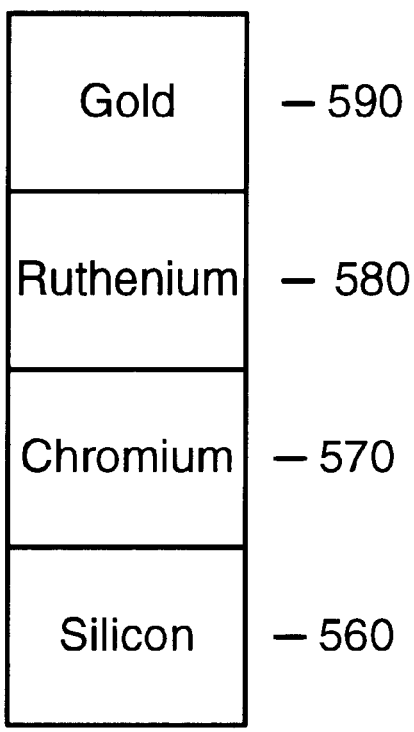
FIG. 5B shows an exemplary optical mirror using ruthenium as a high-temperature diffusion barrier with a chromium adhesion layer in accordance with an embodiment of the present invention.

In one exemplary embodiment of the present invention, ruthenium is used as a high-temperature metallic diffusion barrier under a gold mirror coating. A chromium adhesion layer may be used between the ruthenium diffusion barrier and a silicon substrate. FIG. 5A shows an exemplary optical mirror 510 including a silicon substrate 520, a ruthenium diffusion barrier 530, and a gold mirror coating 530. FIG. 5B shows an exemplary optical mirror 550 including a silicon substrate 560, a chromium adhesion layer 570, a ruthenium diffusion barrier 580, and a gold mirror layer 590.

Figure 6:
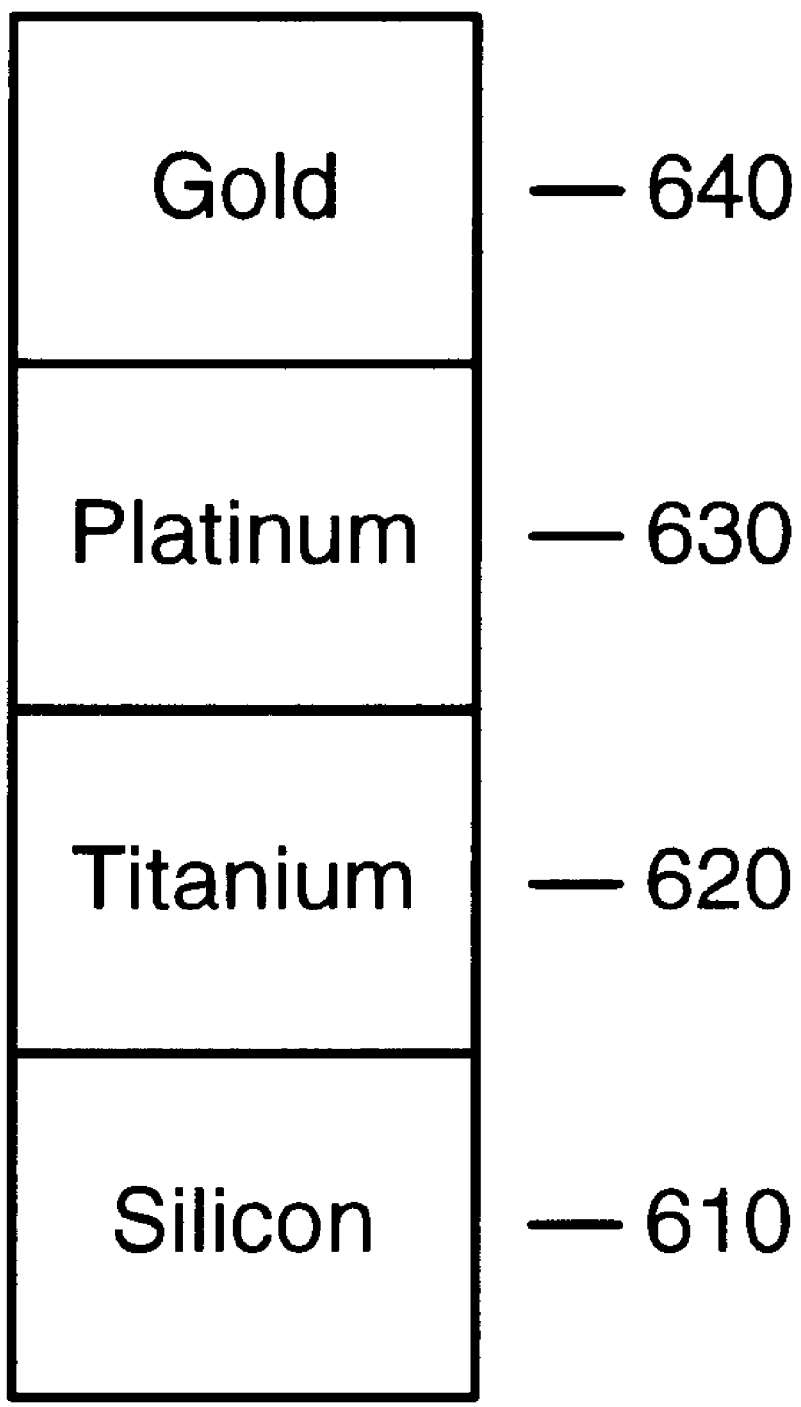
FIG. 6 shows an exemplary optical mirror using platinum as a high-temperature diffusion barrier with a titanium adhesion layer in accordance with an embodiment of the present invention.

In another exemplary embodiment of the present invention, platinum is used as a high-temperature metallic diffusion barrier under a gold mirror coating. FIG. 6 shows an exemplary optical mirror 600 using platinum as a high-temperature diffusion barrier. The optical mirror 600 includes a silicon substrate 610, a titanium adhesion layer 620, a platinum diffusion barrier 630, and a gold mirror coating 640.

Figure 7:
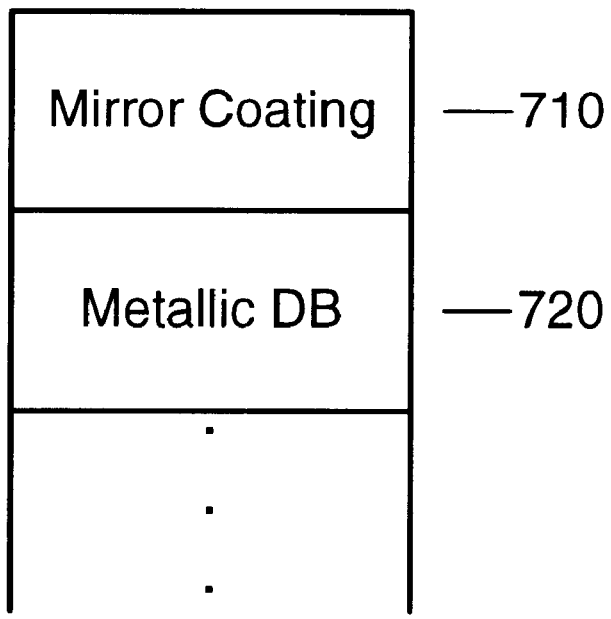
FIG. 7 shows the generic structure of an optical mirror having a high-temperature metallic diffusion barrier in accordance with an embodiment of the present invention.

FIG. 7 shows the generic structure of an optical mirror 700 having a high-temperature metallic diffusion barrier. Among other things, the optical mirror 700 includes a mirror coating 710 backed by a high-temperature metallic diffusion barrier 720.

High-Temperature Amorphous Solid Diffusion Barriers

When an amorphous material is heated, the temperature at which the amorphous region transitions from a glassy state, in which the atoms or molecules are substantially frozen in place, to a state in which the atoms or molecules are more mobile, is referred to as the glass transition temperature (Tg). Such a material does not have a unique value of Tg because the glass phase is not in equilibrium. Rather, the measured value of Tg for a particular amorphous material depends upon a number of factors, the thermal history and age of the material, the measurement method, and the rate of heating or cooling. Although there is no unique value of Tg, an amorphous material can be characterized by an approximate or average value of Tg. Thus, references hereinafter to the glass transition temperature Tg of an amorphous solid indicates an approximate or average value of Tg rather than a unique value of Tg.

As with high BP metals, amorphous solids having a high glass transition temperature Tg generally have high intermolecular binding forces. Thus, atoms do not readily leave and diffuse into adjacent materials, particularly at temperatures substantially below Tg. Furthermore, because free volume increases as the temperature approaches the glass transition temperature Tg, amorphous solids with high glass transition temperatures are less susceptible to in-diffusion of foreign materials at typical process and use temperatures when compared to amorphous solids with low glass transition temperatures.

Thus, amorphous solids having a high glass transition temperature do not readily interdiffuse with other materials.

This is due in part to the high intermolecular binding forces in such materials. A high-temperature amorphous solid diffusion barrier for an optical mirror coating can be selected based upon the glass transition temperature Tg of the material.

Amorphous solids with glass transition temperatures Tg above approximately 500C are good candidates for a high-temperature diffusion barrier under a gold mirror coating. Exemplary high-temperature amorphous solids include amorphous titanium nitride, amorphous nickel-niobium, amorphous tantalum-silicon-nitride, amorphous tungsten nitride, amorphous silicon nitride, and amorphous low-stress silicon nitride. Such materials do not readily interdiffuse with the gold mirror coating. Furthermore, such high-temperature materials are not susceptible to some of the aging mechanisms that plague other materials. Thus, in addition to barrier properties, such high-temperature materials tend to exhibit high dimensional stability (mirror curvature) over the operating life of the optical mirror.

With regard to silicon nitride films, it should be noted that silicon nitride films can be deposited on semiconductor wafers at near stoichiometric ratios in furnaces at a temperature of approximately 800C using low pressure chemical vapor deposition (LPCVD). In silicon nitride, the stoichiometric ratio is 3 silicon atoms per 4 nitrogen atoms. The thickness of such films is commonly above 1000 angstroms. They are typically characterized by refractive index (the refractive index of stoichiometric silicon nitride films is about 2.0).

Silicon nitride passivation films are deposited in PECVD (Plasma Enhanced Chemical Vapor Deposition) processes at lower temperatures (~400C). Lower temperature allows this protective film to be deposited on wafers that have metallizations like aluminum.

Low stress silicon nitride films are formed by raising the silicon content of the film above the stoichiometric 3-to-4 ratio. This can be accomplished in LPCVD by increasing the proportion of dichlorosilane gas fed into the furnace. For low stress nitride, the ratio of dichlorosilane to ammonia for low stress nitride is typically between 3/1 and 6/1. With well-controlled processes, such films can have either small tensile or small compressive stresses. The refractive index of these silicon rich low stress nitride films is in the 2.2 to 2.4 range. Low stress silicon nitride films and various deposition techniques are discussed in [1] [2] [3].

Figure 8:
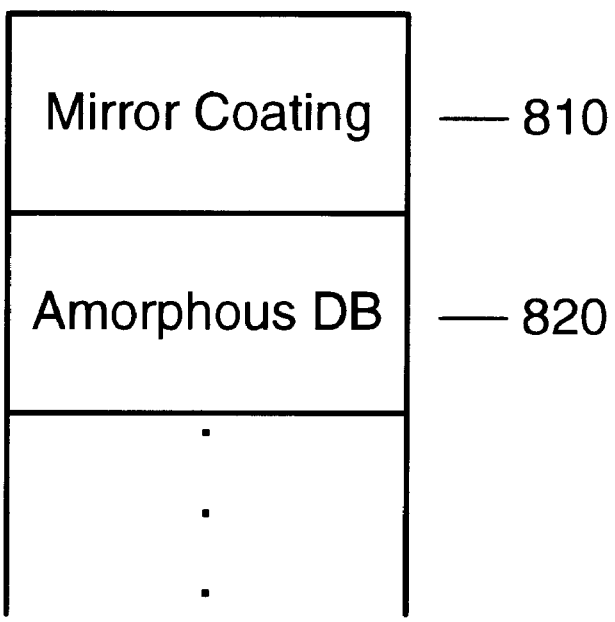
FIG. 8 shows the generic structure of an optical mirror 800 having a high-temperature amorphous diffusion barrier in accordance with an embodiment of the present invention.

FIG. 8 shows the generic structure of an optical mirror 800 having a high-temperature amorphous diffusion barrier. Among other things, the optical mirror 800 includes a mirror coating 810 backed by a high-temperature amorphous solid diffusion barrier 820.

Semi-Crystalline Materials

Many materials are semi-crystalline, having both crystalline regions and amorphous regions. For example, virtually all metals are semi-crystalline, with thermodynamically stable crystalline regions and amorphous inter-granular regions between crystals where diffusion occurs more rapidly. For the reasons stated above, substantially crystalline metallic materials having a high MP and/or a high BP as well as substantially amorphous materials having a high glass transition temperature do not readily interdiffuse, and therefore are good candidates for a high-temperature diffusion barrier for optical mirrors.

Partially Recrystallized Inorganic Amorphous Materials

Most inorganic amorphous films can be partially recrystallized. The result is a film that includes more than one phase. The added phases can be, for example, small metal grains in an amorphous matrix or grains of a crystal compound (such as tungsten nitride crystals dispersed with tungsten crystals in an amorphous tungsten nitride film). Thus, the diffusion barrier materials can include various crystalline materials in addition to crystalline metals and amorphous materials.

Figure 9:
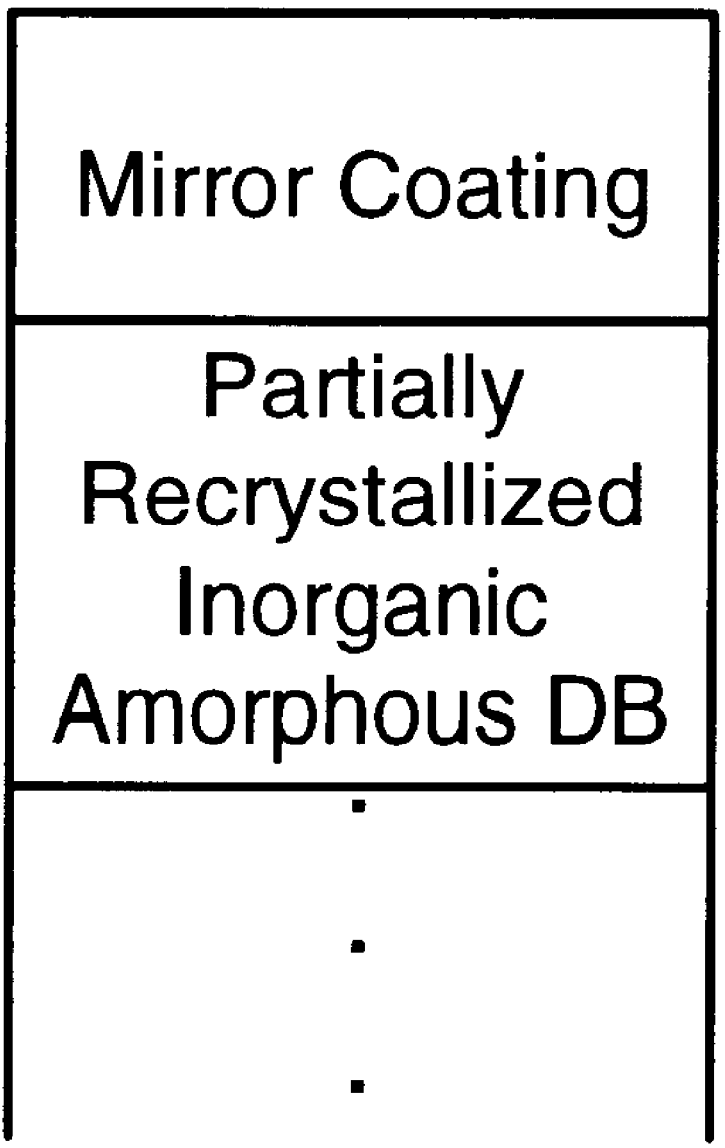
FIG. 9 shows the generic structure of an optical mirror having a high-temperature partially recrystallized inorganic amorphous diffusion barrier in accordance with an embodiment of the present invention.

FIG. 9 shows the generic structure of an optical mirror 900 having a high-temperature partially recrystallized inorganic amorphous diffusion barrier. Among other things, the optical mirror 900 includes a mirror coating 910 backed by a high-temperature partially recrystallized inorganic amorphous diffusion barrier 920.

Mirror Curvature And Stability

Optical mirrors can be produced with flat, concave, or convex curvatures. For communications applications, it is generally desirable to have mirrors that are flat or slightly concave. Convex mirrors are typically undesirable for communications applications. A number of factors can affect mirror curvature and stability, including film material, film stress, film stack composition, layer thickness, deposition conditions and subsequent post-treatments, and process conditions.

Silicon has a low thermal expansion coefficient that is typically lower than most metals (e.g., it expands less than metals when heated). As a result, a silicon optical mirror that has thin mirror metal films on one side is often distorted by film stresses when it is heated. Therefore, an optical mirror that is nearly flat at room temperature can become increasingly convex when heated (most systems are temperature controlled at some level above room temperature).

Certain diffusion barrier materials can be deposited as tensile films. For example, low stress nitride films can be deposited as tensile films. Thus, when used under a gold mirror coating, the tensile stress of the low stress nitride film tends to counteract the compressive stresses that grow in the gold layer as it is heated. This allows the total stack to be flat or slightly concave at the operating temperature. Rather thin low stress silicon nitride films are required in order to keep the stresses low and manageable. Thus, when used in an optical mirror application, the low stress silicon nitride film is typically deposited to a thickness in the range of 50 to 300 angstroms. It is preferably for such films to have low defect counts so that they can act as effective barrier layers. Similar considerations apply to other high Tg amorphous layers and to the high MP/BP layers, such as the gold/platinum/titanium/silicon system shown in FIG. 6.

Control of film stress and adhesion is important for the production of optical mirrors with controlled curvature. Material selection is important, but is only one factor because process parameters also have a significant effect on various characteristics discussed in [15] [16] [17].

Some of the process parameters discussed in [15] [16] [17] alter film stress by modifying the film microstructure. This can be beneficial. For example, a thermal treatment that reduces compressive stress and creates a small tensile stress can be used to produce the flat or slightly concave mirror surfaces that are desirable in many applications. Such treatments alter film morphology by several mechanisms, including grain growth and recrystallization. When applied to amorphous films, modest recrystallization can achieve the desired mirror curvature adjustments without excessively compromising barrier qualities.

Mirror curvature can also be controlled by forming one or more film layers on the front side and/or the back side of the optical mirror structure such that the film stresses of the various film layers bend the mirror into a predetermined shape. Among other things, mirrors with flat, concave, and convex curvatures can be produced by forming one or more film layers on the front side and/or back side of the optical mirror structure. For example, a concave mirror can be produced using a tensile film on the front of the mirror and/or a compressive film on the back of the mirror. A convex mirror can be produced using a tensile film on the back of the mirror and/or a compressive film on the front of the mirror. A flat mirror can be produced using film layers with substantially offsetting film stresses, for example, using front and back film layers with substantially offsetting film stresses. One advantage of an optical mirror shaped by forming film layers on both the front side and the back side of the optical mirror structure is that the mirror shape is relatively insensitive to temperature.

Figure 10:
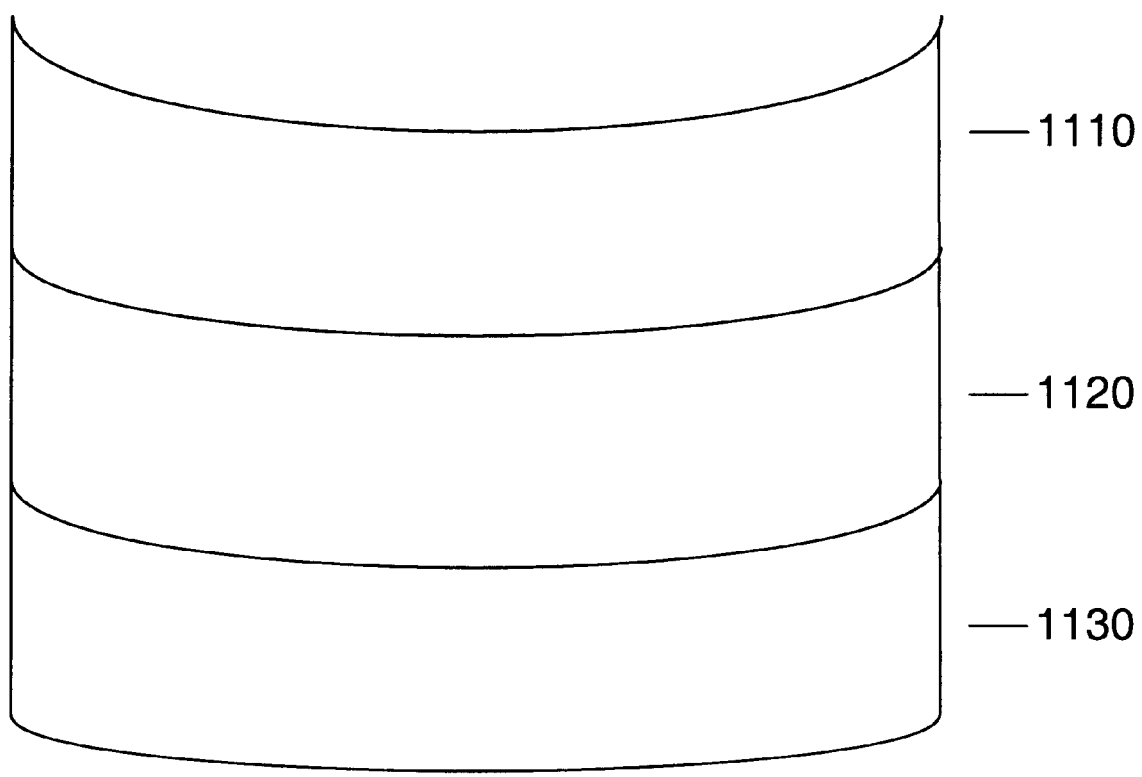
FIG. 10 shows the generic structure of an optical mirror that is shaped by coating both sides of the mirror with materials having different tensile stresses in accordance with an embodiment of the present invention.

FIG. 10 shows the generic structure of an optical mirror 1000 that is shaped using the film stresses of front and/or back film layers. Specifically, a mirror stack layer 1120 is shaped, for example, into a flat, concave, or convex shape, by forming a tensile film 1110 on one side of the mirror stack layer 1120 and/or a compressive film 1130 on the other side of the mirror stack layer 1120. The mirror stack layer 1120 may be any layer in the optical mirror stack, including a single crystal silicon or polysilicon substrate. The diffusion barrier can act as a tensile or compressive film (1110 or 1130) for shaping the mirror stack layer 1120.

It should be noted that multiple film layers may be formed on the front side and/or the back side in order to shape the mirror. Thus, a particular film layer need not be in direct contact with the mirror stack layer 1120 in order to shape the mirror.

It should be noted that the ultimate mirror shape is not necessarily determined by the tensile/compressive characteristics of the coatings at the time of deposition, but rather by the tensile/compressive characteristics of the coatings at process completion. As discussed above, post-deposition processing can change film stress and structure. For example, various thermal processes (e.g., thermal anneal treatments) can reduce compressive stress and create a small tensile stress. Thus, deposition process conditions, materials, and thicknesses can be used to form a mirror having an initial shape, and subsequent processes can be used to alter the film stresses of one or more mirror layers in order to transform the mirror from the initial shape to a target shape.

While it is important to produce the desired mirror curvature, it is also important for the mirror curvature to remain stable through subsequent thermal processes as well as thermal aging during its useful life. When properly processed, the various high-temperature materials that meet the diffusion barrier criteria are typically more dimensionally stable than lower temperature materials.

High-Temperature Diffusion Barrier Applications

Optical mirrors with high-temperature diffusion barriers can be used in a variety of optical applications. In one exemplary embodiment of the present invention, a Micro Electro-Mechanical System (MEMS) includes optical mirrors with high-temperature diffusion barriers. The MEMS may be used for various optical applications, including optical multiplexing and switching for optical networking. Within the MEMS, the optical mirrors are typically micromachined on a silicon substrate. Various mirror layers, including the high-temperature diffusion barrier and the optical mirror coating, are deposited on top of the micromachined silicon substrate in order to form the optical mirrors. The MEMS may be exposed to various high-temperature processes, for example, during assembly into a hermetically-sealed integrated circuit package. By virtue of the high-temperature diffusion barrier, interdiffusion is reduced, and the optical mirrors maintain virtually all of their reflectivity.

It should be noted that interdiffusion is problematic not only for optical mirror applications, but also for electronic applications. Therefore, diffusion barriers are often used in electronic applications, but for reasons unrelated to optical mirror applications. For example, ruthenium and other metals have been used as a diffusion barrier for gold in various electrical applications [14]. Amorphous nickel-niobium has been found to be an effective barrier for both silicon and gold up to a temperature of 500C [7]. Amorphous tungsten-nitride and amorphous tantalum-silicon-nitride are also effective high-temperature barriers for gold-on-silicon [8] [9]. Because different criteria are used for selecting a high-temperature diffusion barrier for an optical mirror application than for selecting a diffusion barrier for an electronic application, a particular material may be acceptable for one application but not the other, or a particular material may be acceptable for both applications but for different reasons. Thus applicability of a particular material in an electronic application does not necessarily translate to applicability of the material in an optical mirror application.

It should be noted that the present invention is in no way limited by the way in which the high-temperature diffusion barrier is deposited. The high-temperature diffusion barrier can be deposited using any of a variety of techniques, including sputtering, evaporation, electroplating, and electroless plating, to name but a few.

The present invention may be embodied in other specific forms without departing from the true scope of the invention. The described embodiments are to be considered in all respects only as illustrative and not restrictive.

What is claimed is:

1. An optical mirror comprising an optical mirror coating and high-temperature diffusion barrier that does not readily interdiffuse with the optical mirror coating at selected elevated temperatures, the high-temperature diffusion barrier characterized by one of:
    an atmospheric boiling point above approximately 3550 degrees Kelvin;
    a combination of a melting point and an atmospheric boiling point such that the product of the melting point and the atmospheric boiling point is above approximately $7.5 \times 10^6 K^2$; and
    a glass transition temperature above approximately 500 degrees Celsius.

2. The optical mirror of claim 1, wherein the high-temperature diffusion barrier comprises a substantially crystalline metallic material having one of:
    an atmospheric boiling point above approximately 3550 degrees Kelvin; and
    a melting point and an atmospheric boiling point such that the product of the melting point and the atmospheric boiling point is above approximately $7.5 \times 10^6 K^2$.

3. The optical mirror of claim 2, wherein the high-temperature diffusion barrier comprises one of vanadium, platinum, rhodium, zirconium, iridium, hafnium, ruthenium, niobium, molybdenum, osmium, tantalum, rhenium, and tungsten.

4. The optical mirror of claim 1, wherein the high-temperature diffusion barrier comprises a substantially amorphous material having a glass transition temperature above approximately 500 degrees Celsius.

5. The optical mirror of claim 4, wherein the high-temperature diffusion barrier comprises one of the following substantially amorphous films: titanium nitride, nickel-niobium, tantalum-silicon-nitride, tungsten nitride, silicon nitride, and low-stress silicon nitride.

6. The optical mirror of claim 1, wherein the high-temperature diffusion barrier comprises a partially recrystallized inorganic amorphous material having a glass transition temperature above approximately 500 degrees Celsius.

7. The optical mirror of claim 6, wherein the high-temperature diffusion barrier comprises an amorphous tungsten nitride material having tungsten nitride crystals dispersed with tungsten crystals.

8. An apparatus comprising at least one optical mirror, wherein the at least one optical mirror comprises an optical mirror coating and a high-temperature diffusion barrier that does not readily interdiffuse with the optical mirror coating at selected elevated temperatures, the high-temperature diffusion barrier characterized by one of:
    an atmospheric boiling point above approximately 3550 degrees Kelvin;
    a combination of a melting point and an atmospheric boiling point such that the product of the melting point and the atmospheric boiling point is above approximately $7.5 \times 10^6 K^2$; and
    a glass transition temperature above approximately 500 degrees Celsius.

9. The apparatus of claim 8, wherein the high-temperature diffusion barrier comprises a substantially crystalline metallic material having one of:
    an atmospheric boiling point above approximately 3550 degrees Kelvin; and
    a melting point and an atmospheric boiling point such that the product of the melting point and the atmospheric boiling point is above approximately $7.5 \times 10^6 K^2$.

10. The apparatus of claim 9, wherein the high-temperature diffusion barrier comprises one of vanadium, platinum, rhodium, zirconium, iridium, hafnium, ruthenium, niodbium, molybdenum, osmium, tantalum, rhenium, and tungsten.

11. The apparatus of claim 8, wherein the high-temperature diffusion barrier comprises a substantially amorphous material having a glass transition temperature above approximately 500 degrees Celsius.

12. The apparatus of claim 11, wherein the high-temperature diffusion barrier comprises one of t he following substantially amorphous films: titanium nitride, nickel-niobium, tantalum-silicon-nitride, tungsten nitride, silicon nitride, and low-stress silicon nitride.

13. The apparatus of claim 8, wherein the high-temperature diffusion barrier comprises a partially recrystallized inorganic amorphous material having a glass transition temperature above approximately 500 degrees Celsius.

14. The apparatus of claim 13, wherein the high-temperature diffusion barrier comprises an amorphous tungsten nitride material having tungsten nitride crystals dispersed with tungsten crystals.

15. The apparatus of claim 8, wherein the apparatus is a Micro Electro-Mechanical System (MEMS) in which the at least one optical mirror is a micro-machined optical mirror onto which the high-temperature diffusion barrier and the optical mirror coating are deposited.

16. A method for producing an optical mirror, the method comprising:
    forming a high-temperature diffusion barrier for the optical mirror; and
    forming an optical mirror coating on the diffusion barrier, wherein the high-temperature diffusion barrier does not readily interdiffuse with the optical mirror coating at selected elevated temperatures and is characterized by one of:
    an atmospheric boiling point above approximately 3550 degrees Kelvin;
    a combination of a melting point and an atmospheric boiling point such that the product of the melting point and the atmospheric boiling point is above approximately $7.5 \times 10^6 K^2$; and
    a glass transition temperature above approximately 500 degrees Celsius.

17. The method of claim 16, wherein the high-temperature diffusion barrier comprises a substantially crystalline metallic material having one of:
    an atmospheric boiling point above approximately 3550 degrees Kelvin; and
    a melting point and an atmospheric boiling point such that the product of the melting point and the atmospheric boiling point is above approximately $7.5 \times 10^6 K^2$.

18. The method of claim 16, wherein the high temperature diffusion barrier comprises a substantially amorphous material having a glass transition temperature above approximately 500 degrees Celsius.

19. The method of claim 16, wherein the high temperature diffusion barrier comprises a partially recrystallized inorganic amorphous material having a glass transition temperature above approximately 500 degrees Celsius.

* * * * *